United States Patent
Jurik et al.

[11] Patent Number: 5,979,860
[45] Date of Patent: Nov. 9, 1999

[54] STEERING COLUMN SUPPORT APPARATUS WITH SHEARABLE RIBS

[75] Inventors: Mirjana Jurik, Rochester Hills; Thomas S. Kaliszewski, Troy; Jeffrey D. Ottenhoff, Royal Oak; Rodney L. Eaton, Clarkston, all of Mich.

[73] Assignee: Chrysler Corporation, Auburn Hills, Mich.

[21] Appl. No.: 09/061,544

[22] Filed: Apr. 16, 1998

[51] Int. Cl.[6] ................................ F16M 13/00
[52] U.S. Cl. .................. 248/548; 74/492; 188/371; 188/376; 280/177
[58] Field of Search ............. 248/548; 280/177; 74/492; 188/371, 376

[56] References Cited

U.S. PATENT DOCUMENTS

| | | | |
|---|---|---|---|
| 3,394,613 | 7/1968 | Curtindale | 74/492 |
| 3,476,345 | 11/1969 | Ristau | 248/221 |
| 4,616,522 | 10/1986 | White et al. | 74/492 |
| 4,746,144 | 5/1988 | Kulczyk | 280/777 |
| 4,884,778 | 12/1989 | Yamamoto | 248/548 |
| 5,310,218 | 5/1994 | Miyoshi et al. | 280/777 |
| 5,390,955 | 2/1995 | Kaliszewski et al. | 280/777 |
| 5,704,254 | 1/1998 | Thomas et al. | 74/492 |
| 5,722,300 | 3/1998 | Buckhard et al. | 74/492 |
| 5,769,455 | 6/1998 | Halacka et al. | 280/777 |
| 5,788,279 | 8/1998 | Pfannebecker | 74/492 |

Primary Examiner—Ramon O. Ramirez
Assistant Examiner—Walter Landry
Attorney, Agent, or Firm—Lawrence Shurupoff

[57] ABSTRACT

A steering column in an automotive vehicle is supported by a stationary wall that carries two capsules on either side of the steering column. The steering column has an attachment wall that extends within the capsules. Each capsule has two support walls sandwiched around the attachment wall and a tubular connector joining the support walls together. Severable ribs are integral with the tubular connector and in contact with edge areas of the attachment wall, such that in a crash situation the steering column can collapse forwardly to minimize chest injury to the driver of the vehicle.

2 Claims, 2 Drawing Sheets

5,979,860

1

STEERING COLUMN SUPPORT APPARATUS WITH SHEARABLE RIBS

BACKGROUND OF THE INVENTION

1. Field of the Invention

This invention relates to a support structure for the steering column of a steering wheel in an automotive vehicle. The invention is an improvement on the steering column support structure disclosed in U.S. Pat. No. 5,390,955 assigned to the assignee of the present patent application.

2. Description of Prior Developments

U.S. Pat. No. 5,390,955, issued to T. Kaliszewski et al, discloses a steering column support structure that includes two stationary capsules located along side surfaces of the column to grip upper and lower surfaces of attachment walls extending from the column. Each capsule has a bolt for securing the respective capsule to a stationary support structure, and two pins extending through notches formed in the steering column attachment wall. In a crash situation involving forward displacement of the steering wheel, the steering column attachment walls exert shearing forces on the pins; the pins are severed to enable the steering column to move forward.

U.S. Pat. No. 3,476,345, issued to T. Ristau, shows a steering column support structure that includes two capsules bolted to a stationary support structure, and two brackets carried by the steering column. Each capsule has two channels fitting around edge areas of the associated bracket and two shearable pins extending through the channels and cutouts in the bracket. In a crash situation the bracket walls exert shearing forces on the pins.

U.S. Pat. No. 4,884,778, issued to Y. Yamamoto, shows a steering column support structure that includes stationary capsules formed out of metal and resin components. The metal component is bolted to a stationary support without producing any creep in the resin component. During a crash situation, flat plates carried by the steering column exert shearing forces on projections formed on the resin components of the stationary capsules.

SUMMARY OF THE INVENTION

The present invention relates to a steering column support structure that includes two stationary support capsules located outboard from the steering column, and two attachment walls extending laterally from the steering column into the support capsules. Each capsule includes an upper wall overlying the associated attachment wall, a lower wall underlying the associated attachment wall, and a tubular connector extending between said upper and lower walls.

Each capsule further includes two shearable ribs integral with the tubular connector. The attachment wall has a cutout partially encircling the tubular connector, and two notches fitting around the shearable ribs. During a crash situation involving forward displacement of the steering wheel such as forcible contact with the person driving the vehicle, the steering column attachment wall exerts a shearing action on the shearable ribs, so that the ribs are sheared to permit continued movement of the steering wheel in the forward direction.

Each capsule preferably is formed of two plastic components secured together by a gluing or heat-staking process performed after the capsule components have been prepositioned on the steering column attachment wall. The assembly procedure advantageously minimizes assembly errors and problems, while providing a resultant assembly wherein the shearable ribs are precisely oriented relative to the notches in the steering column attachment wall.

In prior constructions, using two-piece snap fit connectors; a problem arose during assembly of the steering column wherein the capsules were knocked off the steering column support. This invention solves that problem.

Further features of the invention will be apparent from the attached drawings and description of a preferred embodiment of the invention.

DESCRIPTION OF A PREFERRED EMBODIMENT OF THE INVENTION

Figure 1:
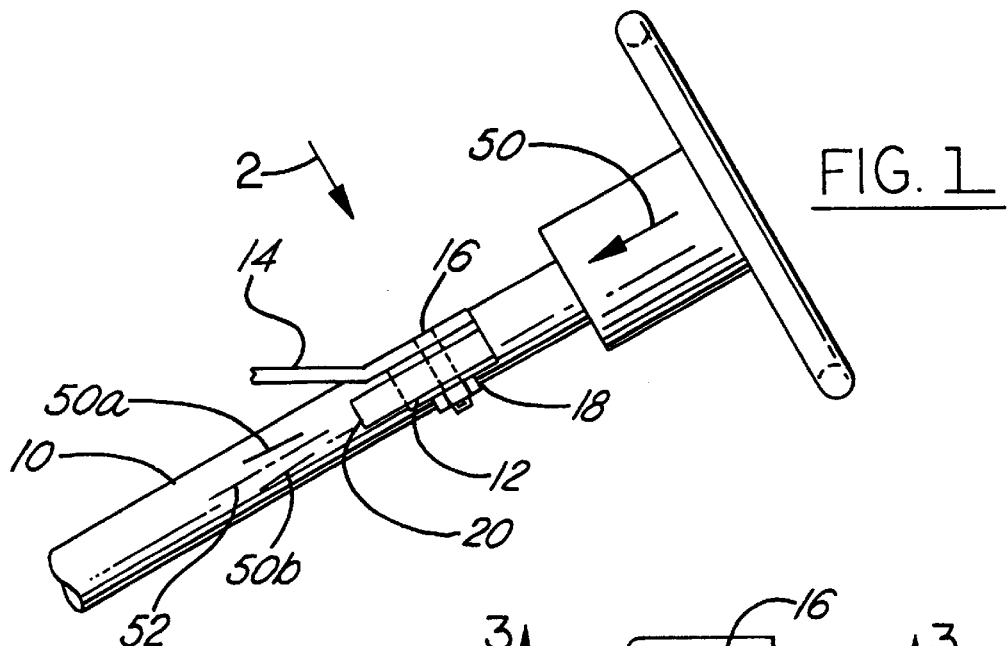
FIG. 1 is a side elevational view of an automotive steering column having a support structure of the present invention.
Figure 2:
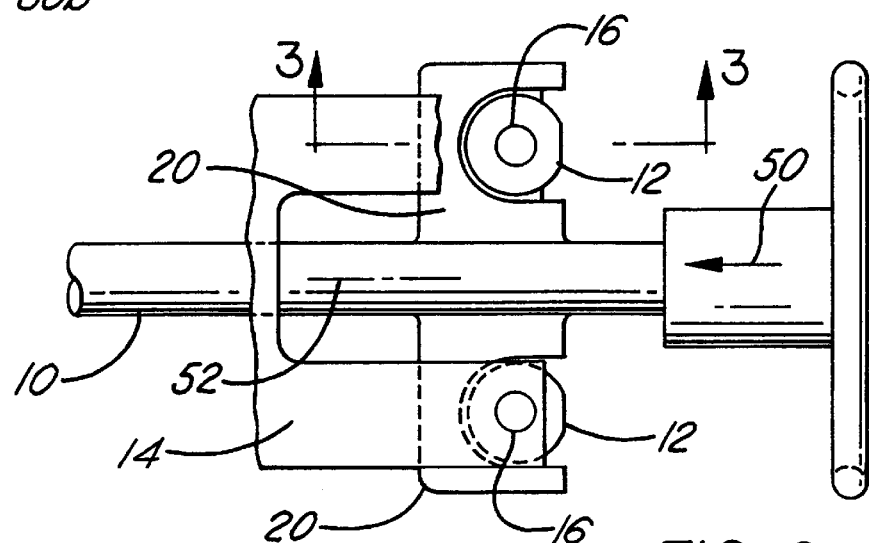
FIG. 2 is a fragmentary plan view in the direction of arrow 2 in FIG. 1.

Referring to FIGS. 1 through 4, there is shown an automotive steering column 10 having a support structure constructed according to the present invention. The support structure includes two similarly constructed capsules 12 bolted to a stationary wall 14 by means of studs 16 and nuts 18. The steering column has a bracket comprising two laterally extending attachment walls 20 extending into the space circumscribed by capsules 12, whereby the capsules transmit a major portion of the steering column weight onto stationary wall 14. The overall arrangement is generally similar to the arrangement disclosed in aforementioned U.S. Pat. No. 5,390,955.

Each support capsule 12 includes two separate components formed of a plastic material, preferably a plastic material having fiberglass reinforcement fibers incorporated therein. The plastic capsule includes a lower support wall 22 engaging the lower surface of attachment wall 20, and an upper support wall 24 engaging the upper surface of attachment wall 20. A tubular connector 28 extends from wall 22 into wall 24, whereby the capsule has a spool-like configuration.

Figure 3:
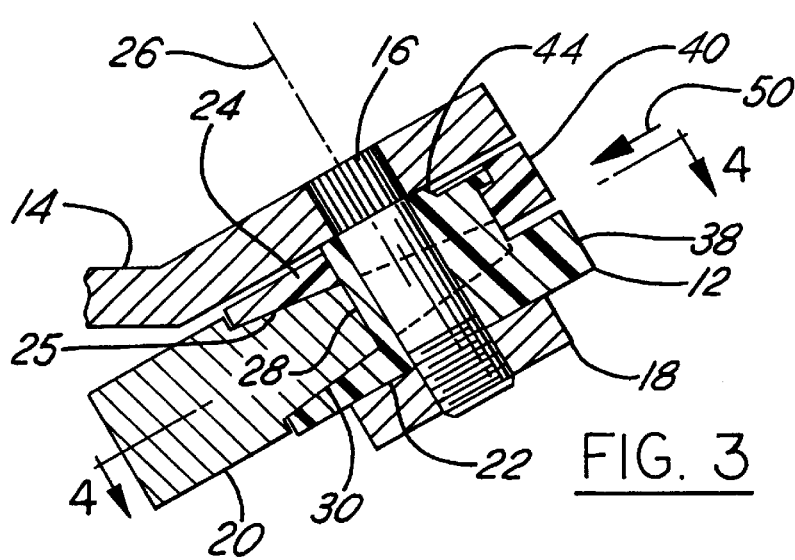
FIG. 3 is an enlarged fragmentary sectional view taken on line 3—3 in FIG. 2.
Figure 6:
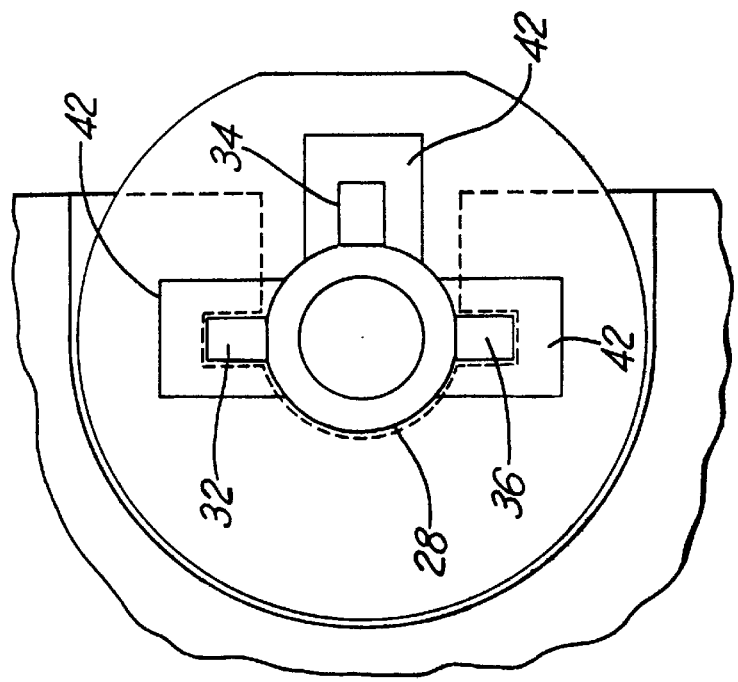
FIG. 6 is a top plan view of the FIG. 5 assembly, taken in the direction of arrow 6 in FIG. 5.
Figure 5:
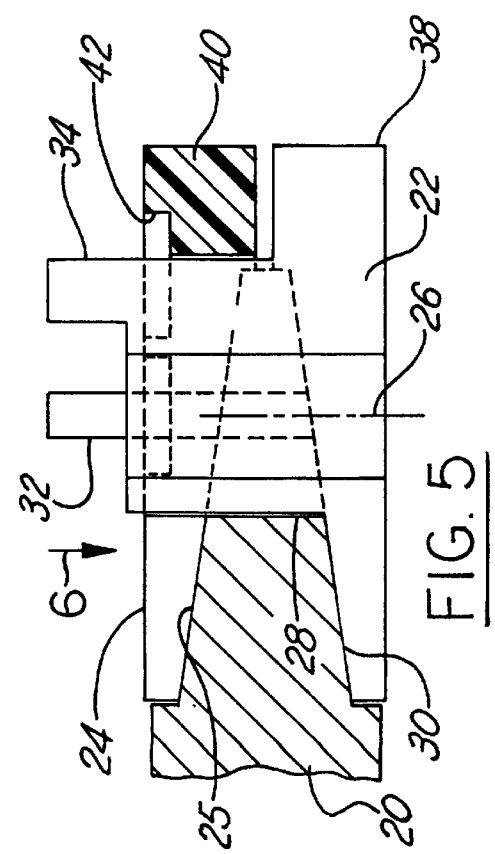
FIG. 5 is an enlarged sectional view taken in the same direction as FIG. 4, but prior to the process of heat-staking the capsule components together.

The areas of attachment wall 20 in contact with capsules 12 are somewhat segment-shaped, as depicted in FIGS. 3 and 5. Upper surface 25 of attachment wall 20 is a flat surface acutely angled to the axis 26 of tubular connector 28 extending between capsule walls 22 and 24. Lower surface 30 of attachment wall 20 is a flat surface acutely angled to the axis 26 of tubular connector 28. The acute angulations of flat surfaces 25 and 30 relative to axis 26 are preferably the same. Each support wall 22 or 24 has extensive surface area engagement with the associated surface 25 or 30 of attachment wall 20.

Figure 4:
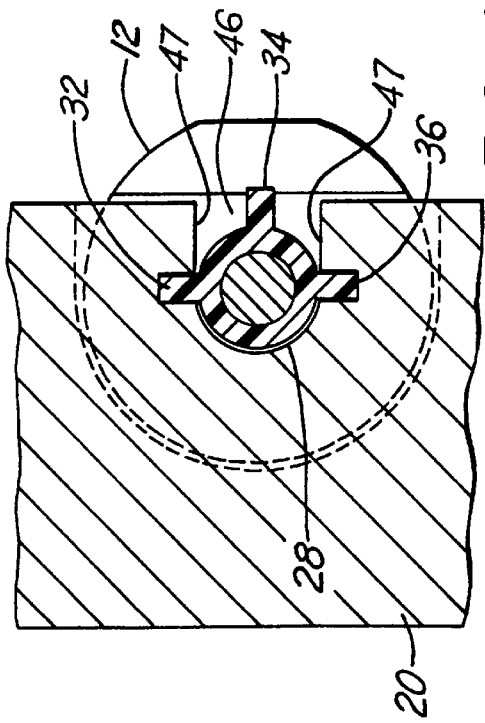
FIG. 4 is a fragmentary sectional view taken on line 4—4 in FIG. 3.

Lower support wall 22 of each capsule is integral with the associated tubular connector 28. The tubular connector is integral with three radial ribs 32, 34 and 36. As shown in FIG. 4, each rib has a rectangular cross section radiating away from the connector axis 26. The central cylindrical opening formed by each tubular connector accommodates the shank of a mounting bolt 16 that extends through stationary wall 14, whereby the two capsules 12, 12 are attached to wall 14, as shown best in FIG. 3.

As depicted in FIGS. 3 and 5, upper support wall 24 of each capsule 12 is formed separately from lower wall 22. Wall 22 and tubular connector 28 form one component 38 of the capsule assembly. Wall 24 forms the second component 40 of the capsule assembly. Upper wall 24 has a central opening configured to the outline configurations of tubular connector 28 and the three radial ribs 32, 34 and 36. Wall 24 is assembled onto tubular connector 28 after the segment-shaped area of attachment wall 20 is in position on lower support wall 22.

Upper wall 24 of each capsule can be connected to tubular connector 28 by a heat-staking process or by a solvent adhesive. The mounting stud-nut mechanism 16, 18 is extended between stationary wall 14 and each capsule 12 after the capsule has been formed and frictionally secured to steering column attachment wall 20.

FIG. 5 shows one capsule component configuration that can be used when the two plastic components 38 and 40 are connected together by a heat-staking operation. The lower capsule component 38 is positioned against the lower surface of attachment wall 20, with tubular connector 28 extending upwardly through the central opening in wall 20. Thereafter, the upper capsule component 40 is positioned on the upper end of tubular connector 28, as shown in FIG. 5. Wall 24 of component 40 has an opening configured to the external contour on connector 28 and the three radial ribs 32, 34 and 36, whereby component 40 can be positioned on the upper surface of attachment wall 24, as shown in FIG. 5.

End areas of tubular connector 28 protrude above the plane of capsule component 40, whereby heat and pressure can be applied to the end surfaces of the connector and ribs 32, 34 and 36, so as to rigidly join the two capsule components 38 and 40 together by a heat-staking operation. FIG. 3 shows the cross-sectional configuration after the heat-staking operation. FIG. 5 shows the cross-sectional configuration prior to the heat-staking operation.

During the heat-staking operation the upper ends of ribs 32, 34 and 36 are deformed downwardly onto the upper face of capsule wall 24. Rectangular retainer recesses 42 are pre-formed in the upper surface of wall 24 to accommodate and receive the heat-deformed portions of ribs 32, 34 and 36. The upper annular end of tubular connector 28 is deformed into an annular bead 44 on the upper surface of wall 24. Bead 44 and the heat-deformed areas of ribs 32, 34 and 36 secure capsule components 38 and 40 together on the steering column attachment wall 20.

Attachment wall 20 is preformed with a cutout 46 (FIG. 4) that partially encircles tubular connector 28 and ribs 32 and 36. Thus, edges 47 of the cut-out have facing rectangular notches conforming to rib 32 and 36, such that attachment walls 20 can separate from the support capsules when a crash force is applied to the steering column in the direction of arrow 50 (FIGS. 1 through 4). Application of a crash force in the arrow 50 direction causes wall 20 to sever the ribs 32 and 36 by a shearing action, thus enabling the steering wheel and steering column to move forward so as to minimize injury to the human driver.

FIG. 5 shows the tubular connector 28 and associated ribs 32, 36 etc., projecting above the plane of capsule wall 24. Such projections are useful when the two capsule components 38 and 40 are to be connected together by a heat staking operation. When the components are connected together by a solvent adhesive (on the surfaces of the tubular connector and associated ribs) the tubular connector and associated ribs can terminate in the plane of upper wall 24.

Ribs 32 and 36 form shearable connections between each capsule 12 and the associated attachment walls 20. Referring to FIGS. 1 through 4, in a crash situation involving the application of an impact force from the driver's chest onto the steering wheel, a crash force 50 is applied through attachment walls 20 to the capsule ribs 32 and 36. Walls 20 shear the ribs 32 and 36, to enable the steering wheel and steering column to move forward so as to minimize injury. During normal vehicle operation ribs 32 and 36 remain intact so that the steering wheel can be operated in the usual fashion.

The illustrated capsule construction is advantageous in that the capsule is formed of only two components 38 and 40. There are no separate shearable pins, as in certain prior art arrangements. The shearable ribs 32 and 36 are integral with tubular connector 28, such that assembly of the capsule onto steering column attachment wall 20 is relatively easy. There are no small parts that can be easily lost or broken during storage or assembly operation.

A further advantage of the illustrated construction is that by making the shearable ribs integral with the tubular connector the ribs are resistant to bending forces; the ribs are severable solely by shear cutting forces. When the shearable elements are pins, as in the prior art, the severing force can produce some bending of the pins. The action is somewhat unpredictable.

The illustrated capsule construction is further advantageous is that the fit of the capsule on wall 20 does not depend on the torque used to tighten nut 18 on stud 16. The fit of capsule walls 22 and 24 depends on the height of the attachment wall 20.

For example, if the crash force were to be applied along directional line 50a or 50b (FIG. 1) the attachment wall 20 could separate from capsule 12 after severing the ribs 32 and 36.

The drawings show a specific form that the invention can take. However, it will be appreciated that the invention can be practiced in various forms and configurations.

What is claimed is:

1. Apparatus for supporting an elongated steering column of an automotive vehicle and permitting axial collapse of the steering column in a collision comprising;

support structure including a stationary wall, a bracket adapted to be secured to said steering column, means securing said bracket to said stationary wall comprising spaced apart first and second fasteners, said first fastener including a first bolt extending through first aligned openings in said stationary wall and in said bracket, said second fastener including a second bolt extending through second aligned openings in said stationary wall and in said bracket, a first plastic capsule carried by said first bolt, a second plastic capsule carried by said second bolt, each of said capsules including first and second capsule components which are secured to one another in a spaced, opposed relationship, said bracket being clamped between the capsule components of said first and second capsules, the first component of said first capsule having an integral tubular first connector extending through the first opening in said bracket and through a hole in the second component thereof, the first component of said second capsule having an integral tubular second connector extending through the second opening in said bracket and through a hole in the second component thereof, said first bolt extending through said first tubular connector and said second bolt extending through said second tubular connector, each of said tubular connectors having radially outwardly extending integral ribs, said first opening in said bracket having notches receiving said respective ribs of said first tubular connector, said second opening in said bracket having notches receiving said respective ribs of said second tubular connector, said ribs being shearable from said connectors to permit collapse of the steering column in the event of a collision.

2. Apparatus as set forth in claim 1, wherein the second component of said first capsule has retainer recesses receiving portions of the respective ribs projecting from the first tubular connector of the first component thereof, the second component of said second capsule has retainer recesses receiving portions of the respective ribs projecting from the second tubular connector of the first component thereof, the tubular connector of the first component of each of said capsules having an annular bead at one end thereof extending over the second component thereof, said recesses, rib portions and beads providing a permanent connection between the components of each of said capsules.

* * * * *